(12) United States Patent
Yang

(10) Patent No.: US 10,534,142 B2
(45) Date of Patent: Jan. 14, 2020

(54) ASSEMBLY OF ELECTRICAL CONNECTOR COMBINATION AND OPTICAL FIBER CONNECTOR COMBINATION

(71) Applicant: LOTES CO., LTD, Keelung (TW)

(72) Inventor: Qi Xiao Yang, Keelung (TW)

(73) Assignee: LOTES CO., LTD, Keelung (TW)

( * ) Notice: Subject to any disclaimer, the term of this patent is extended or adjusted under 35 U.S.C. 154(b) by 14 days.

(21) Appl. No.: 15/903,389

(22) Filed: Feb. 23, 2018

(65) Prior Publication Data

US 2019/0113693 A1 Apr. 18, 2019

(30) Foreign Application Priority Data

Oct. 13, 2017 (CN) .......................... 2017 1 0953892

(51) Int. Cl.
G02B 6/36 (2006.01)
G02B 6/38 (2006.01)

(52) U.S. Cl.
CPC ......... *G02B 6/3883* (2013.01); *G02B 6/3825* (2013.01)

(58) Field of Classification Search
CPC .. G02B 6/3885; G02B 6/3825; G02B 6/3821; G02B 6/3887; G02B 6/387; G02B 6/3897; G02B 6/3882; G02B 6/38; G02B 6/3883
USPC ............................................... 385/53–89, 92
See application file for complete search history.

(56) References Cited

U.S. PATENT DOCUMENTS

| | | | |
|---|---|---|---|
| 4,217,030 A * | 8/1980 | Howarth | G02B 6/3841 385/59 |
| 6,776,652 B2 * | 8/2004 | Nakura | G02B 6/3817 439/109 |
| 7,963,704 B2 | 6/2011 | Andrei et al. | |
| 9,500,812 B2 | 11/2016 | Tanaka et al. | |
| 9,500,815 B2 | 11/2016 | Good et al. | |
| 2012/0195556 A1 * | 8/2012 | Wang | G02B 6/3817 385/77 |
| 2016/0091668 A1 | 3/2016 | Nakazono et al. | |
| 2017/0010422 A1 | 1/2017 | Childers et al. | |

(Continued)

FOREIGN PATENT DOCUMENTS

| | | |
|---|---|---|
| CN | 100474016 C | 4/2009 |
| CN | 101562298 A | 10/2009 |

(Continued)

*Primary Examiner* — Kaveh C Kianni
*Assistant Examiner* — Hung Q Lam
(74) *Attorney, Agent, or Firm* — Locke Lord LLP; Tim Tingkang Xia, Esq.

(57) ABSTRACT

An assembly includes: a first circuit board, having an electrical connector assembly and an optical fiber connector assembly side by side, the electrical connector assembly is protrudingly provided with a first guiding mechanism in a front-rear direction, which includes a first guiding section and a second guiding section, and the optical fiber connector assembly has an aligning portion; and a second circuit board, having a mating electrical connector assembly and a mating optical fiber connector assembly side by side, the mating electrical connector assembly has a first matching region, which includes a first matching section and a second matching section, and the mating optical fiber connector assembly has an adaptation portion. When the first guiding section penetrates through the first matching section and enters the second guiding section, the aligning portion starts entering the adaptation portion.

11 Claims, 14 Drawing Sheets

(56) References Cited

U.S. PATENT DOCUMENTS

2017/0031106 A1 2/2017 Takano et al.
2017/0097472 A1 4/2017 Miller
2017/0131488 A1 5/2017 Yu et al.

FOREIGN PATENT DOCUMENTS

| CN | 102468569 A | 5/2012 |
| CN | 102782545 B | 7/2015 |
| CN | 105556357 A | 5/2016 |
| CN | 107065086 A | 8/2017 |
| TW | 201246700 A | 11/2012 |

* cited by examiner

A-A

ASSEMBLY OF ELECTRICAL CONNECTOR COMBINATION AND OPTICAL FIBER CONNECTOR COMBINATION

CROSS-REFERENCE TO RELATED PATENT APPLICATION

This non-provisional application claims priority to and the benefit of, pursuant to 35 U.S.C. § 119(a), patent application Serial No. CN201710953892.0 filed in China on Oct. 13, 2017. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to an assembly of an electrical connector combination and an optical fiber connector combination, and more particularly to an assembly of an electrical connector combination and an optical fiber connector combination with a guiding function.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An optical fiber connector assembly which is common in the industry generally includes an optical fiber connector and a mating optical fiber connector which mates with the optical fiber connector. The optical fiber connector includes an insulating seat and multiple optical fibers which are accommodated in the insulating seat. The front ends of the optical fibers are exposed at the front end of the insulating seat. Two guiding columns are respectively provided at the left side and the right side of the optical fiber connector. The mating optical fiber connector includes a plastic seat and multiple mating optical fibers which are accommodated in the plastic seat. Two positioning holes are concavely formed at the left side and the right side of the mating optical fiber connector respectively. When the optical fiber connector mates with the mating optical fiber connector, the guiding columns are inserted in the positioning holes so as to guide the optical fiber connector and the mating optical fiber connector, and the mating optical fibers and the optical fiber are in signal conduction. However, because the size of the optical fiber connector and the size of the mating optical fiber connector are both small, the guiding columns are thin, and the structural strength is low. Moreover, the diameters of the positioning holes are small, and the guiding columns cannot be accurately inserted easily, which may easily result in that the guiding columns are inserted askew and then damaged and even broken, thereby affecting mating between the optical fibers and the mating optical fibers, and affecting signal transmission.

Therefore, a heretofore unaddressed need to design a novel assembly of an electrical connector combination and an optical fiber connector combination exists in the art to address the aforementioned deficiencies and inadequacies.

SUMMARY

An objective of the present invention is to provide an assembly of an electrical connector combination and an optical fiber connector combination, where an electrical connector assembly mates with a mating electrical connector assembly at first to guide the optical fiber connector assembly to mate with a mating optical fiber connector assembly accurately, so as to prevent the optical fiber connector assembly from being damaged.

In order to achieve the foregoing objective, the present invention adopts the following technical solutions.

In one aspect, the present invention provides an assembly, including: a first circuit board, provided with an electrical connector assembly and an optical fiber connector assembly side by side, wherein the electrical connector assembly is protrudingly provided with a first guiding mechanism in a front-rear direction, the first guiding mechanism comprises a first guiding section positioned at a front end thereof and a second guiding section extending backward from the first guiding section, and the optical fiber connector assembly is provided with an aligning portion in the front-rear direction; and a second circuit board opposite to the first circuit board, wherein the second circuit board is provided with a mating electrical connector assembly and a mating optical fiber connector assembly side by side, the mating electrical connector assembly is provided with a first matching region corresponding to the first guiding mechanism, the first matching region comprises a first matching section and a second matching section extending backward from the first matching section, and the mating optical fiber connector assembly is provided with an adaptation portion. When the first guiding section penetrates through the first matching section and enters the second matching section, the aligning portion starts entering the adaptation portion.

In certain embodiments, the first guiding section is provided with two chamfers at two sides thereof in a left-right direction respectively, a width of the first matching section is gradually decreased backward from a front, and a width of the second matching section is smaller than or equal to a minimum width of the first matching section.

In certain embodiments, the electrical connector assembly comprises a plastic body and a plurality of conductive terminals accommodated in the plastic body, and the first guiding mechanism is formed by protruding forward from a front end surface of the plastic body; and the mating electrical connector assembly comprises an insulating body and a plurality of mating terminals accommodated in the insulating body, the mating terminals electrically mate with the conductive terminals correspondingly, and the first matching region is formed by recessing backward from a front end surface of the insulating body to match with the first guiding mechanism.

In certain embodiments, the conductive terminals are soldered to the first circuit board, the mating terminals are soldered to the second circuit board, the electrical connector assembly is fixedly mounted on the first circuit board, and the mating electrical connector assembly is fixedly mounted on the second circuit board.

In certain embodiments, the optical fiber connector assembly comprises a fixing seat mounted on the first circuit board, a sliding seat movably mounted on the fixing seat, and an optical fiber connector mounted on the sliding seat, wherein two aligning portions are respectively provided at a left side and a right side of the optical fiber connector; and the mating optical fiber connector assembly comprises a base mounted on the second circuit board and a mating optical fiber connector mounted on the base, wherein two adaptation portions are respectively provided at a left side and a right side of the mating optical fiber connector to correspondingly match with the two aligning portions.

In certain embodiments, the optical fiber connector is floatable with respect to the fixing seat in the front-rear direction, a left-right direction and a vertical direction, and the mating optical fiber connector is fixedly mounted on the base.

In certain embodiments, gaps are formed between the sliding seat and the fixing seat in the front-rear direction, the left-right direction and the vertical direction respectively, and the optical fiber connector is fixedly mounted on the sliding seat, so that the sliding seat is floatable with respect to the fixing seat.

In certain embodiments, the fixing seat is provided with at least one first elastic member and at least one second elastic member, the at least one first elastic member elastically abuts the sliding seat in the front-rear direction, and the second elastic member elastically abuts the sliding seat in the vertical direction.

In certain embodiments, the fixing seat has two side walls respectively provided at a left side and a right side thereof, and a rear stopping wall connecting the two side walls, the two side walls and the rear stopping wall jointly define an accommodating space for accommodating the sliding seat, the rear stopping wall is protrudingly provided with at least one first post forward, the sliding seat is protrudingly provided with a second post backward and opposite to the first post, one end of the at least one first elastic member is fixed on the at least one first post, and the other end of the at least one first elastic member is fixed on the second post.

In certain embodiments, the fixing seat is provided with a through hole penetrating one side of the fixing seat in the front-rear direction, and a latch member provided at the other side of the fixing seat; a pivot is inserted and fixed in the through hole, and two ends of the pivot are projected out of the through hole; and one side of a cover has two pivoting holes respectively pivoted with the two ends of the pivot, and a buckle portion is provided at the other side of the cover to latch with the latch member. In another aspect, the present invention further provides an assembly, including: a first circuit board, provided with an electrical connector assembly and an optical fiber connector assembly side by side, wherein the electrical connector assembly is protrudingly provided with a first guiding mechanism in a front-rear direction, the first guiding mechanism comprises a first guiding section positioned at a front end thereof and a second guiding section extending backward from the first guiding section, the optical fiber connector assembly comprises a fixing seat mounted on the first circuit board, a sliding seat movably mounted on the fixing seat, and an optical fiber connector mounted on the sliding seat, the sliding seat is protrudingly provided with a second guiding mechanism in the front-rear direction, the second guiding mechanism comprises a third guiding section positioned at a front end thereof and a fourth guiding section extending backward from the third guiding section, and the optical fiber connector is provided with a aligning portion; and a second circuit board, provided with a mating electrical connector assembly and a mating optical fiber connector assembly side by side, the mating electrical connector assembly is provided with a first matching region, the first matching region comprises a first matching section and a second matching section, the mating optical fiber connector assembly comprises a base mounted on the second circuit board and a mating optical fiber connector mounted on the base, the base is provided with a second matching region, the second matching region comprises a third matching section and a fourth matching section extending backward from the third matching section, and the mating optical fiber connector is provided with an adaptation portion. When the first guiding section penetrates through the first matching section and enters the second matching section, and the third guiding section penetrates through the third matching section and enters the fourth matching section, the aligning portion starts entering the adaptation portion.

In certain embodiments, the first guiding section is provided with two chamfers at two sides thereof in a left-right direction respectively, the first matching region is formed by recessing backward from a front end surface of the mating electrical connector assembly, a width of the first matching section is gradually decreased backward from a front, and a width of the second matching section is smaller than or equal to a minimum width of the first matching section.

In certain embodiments, when the first guiding section penetrates through the first matching section and enters the second matching section, the third guiding section penetrates through the third matching section and enters the fourth matching section.

In certain embodiments, after the first guiding section penetrates through the first matching section and enters the second matching section, the third guiding section starts entering the third matching section, and after the third guiding section penetrates through the third matching section and enters the fourth matching section, the aligning portion starts entering the adaptation portion.

In certain embodiments, after the third guiding section penetrates through the third matching section and enters the fourth matching section, the first guiding section penetrates through the first matching section and enters the second matching section, and after the first guiding section penetrates through the first matching section and enters the second matching section, the aligning portion starts entering the adaptation portion.

In certain embodiments, the electrical connector assembly comprises a plastic body and a plurality of conductive terminals accommodated in the plastic body, and the first guiding mechanism is formed by protruding forward from a front end surface of the plastic body; and the mating electrical connector assembly comprises an insulating body and a plurality of mating terminals accommodated in the insulating body, the mating terminals electrically mate with the conductive terminals correspondingly, and the first matching region is formed by recessing backward from a front end surface of the insulating body to match with the first guiding mechanism.

In certain embodiments, the conductive terminals are soldered to the first circuit board, the mating terminals are soldered to the second circuit board, the electrical connector assembly is fixedly mounted on the first circuit board, and the mating electrical connector assembly is fixedly mounted on the second circuit board.

In certain embodiments, gaps are formed between the sliding seat and the fixing seat in the front-rear direction, the left-right direction and the vertical direction respectively, so that the sliding seat is floatable with respect to the fixing seat, the optical fiber connector is fixedly mounted on the sliding seat, two second guiding mechanisms are provided, and are inserted and fixed in a left side and a right side of the sliding seat respectively, and two aligning portions are provided, and are inserted and fixed in a left side and a right side of the optical fiber connector respectively.

In certain embodiments, the fixing seat is provided with at least one first elastic member and at least one second elastic member, the at least one first elastic member elastically abuts the sliding seat in the front-rear direction, and the second elastic member elastically abuts the sliding seat in the vertical direction.

In certain embodiments, a front end surface of the sliding seat is backward sequentially and concavely provided with a first accommodating groove and a second accommodating groove communicating with each other, and a width of the second accommodating groove is smaller than a width of the first accommodating groove; the optical fiber connector comprises an insulating seat; the insulating seat comprises a mating section and a connecting section connected with the rear end of the mating section; multiple optical fibers are exposed at a front end of the mating section and extend to the connecting section; and the mating section is fixed in the first accommodating groove, and the connecting section is partially accommodated in the second accommodating groove.

Compared with the related art, in the assembly, the electrical connector assembly is provided with the first guiding mechanism, and the mating electrical connector assembly is provided with the first matching region corresponding to the first guiding mechanism. The first guiding mechanism matches with the first matching region, so that the aligning portion of the optical fiber connector assembly can be guided to align to the adaptation portion of the mating optical fiber connector assembly, and can be accurately inserted, thus preventing the aligning portion from being inserted askew, then crashed and even broken, and preventing the optical fiber connector assembly from being damaged, thereby ensuring the optical fiber to mate with the mating optical fiber well and better signal transmission effect.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
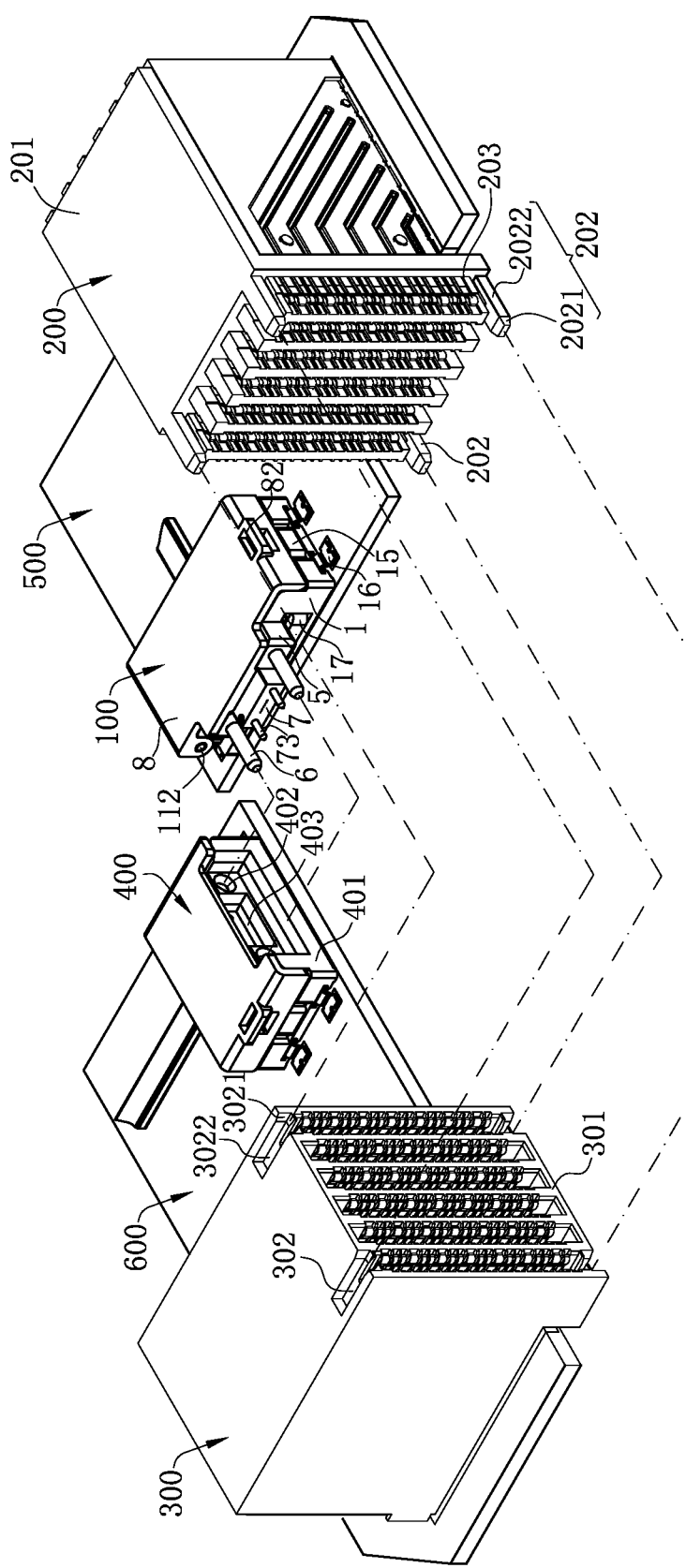
FIG. 1 is a schematic structural view of an assembly according to a first embodiment of the present invention, where an electrical connector assembly is not mated with a mating electrical connector assembly, and an optical fiber connector assembly is not mated with a mating optical fiber connector assembly.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

As used herein, the terms "assembly" and "combination" respectively refer an assembly of multiple components. It should be particularly noted that an assembly or a combination may function as a component of another assembly or a component of another combination. For example, an "electrical connector combination" is formed by an "electrical connector assembly" mated with a "mating electrical connector assembly," and an "optical fiber connector combination" is formed by an "optical fiber connector assembly" mated with a "mating optical fiber connector assembly." Further, an assembly is formed by the "electrical connector combination" and the "optical fiber connector combination."

The description will be made as to the embodiments of the present invention in conjunction with the accompanying drawings in FIGS. 1-14. In accordance with the purposes of this invention, as embodied and broadly described herein, this invention, in one aspect, relates to an assembly of an electrical connector combination and an optical fiber connector combination.

Figure 9:
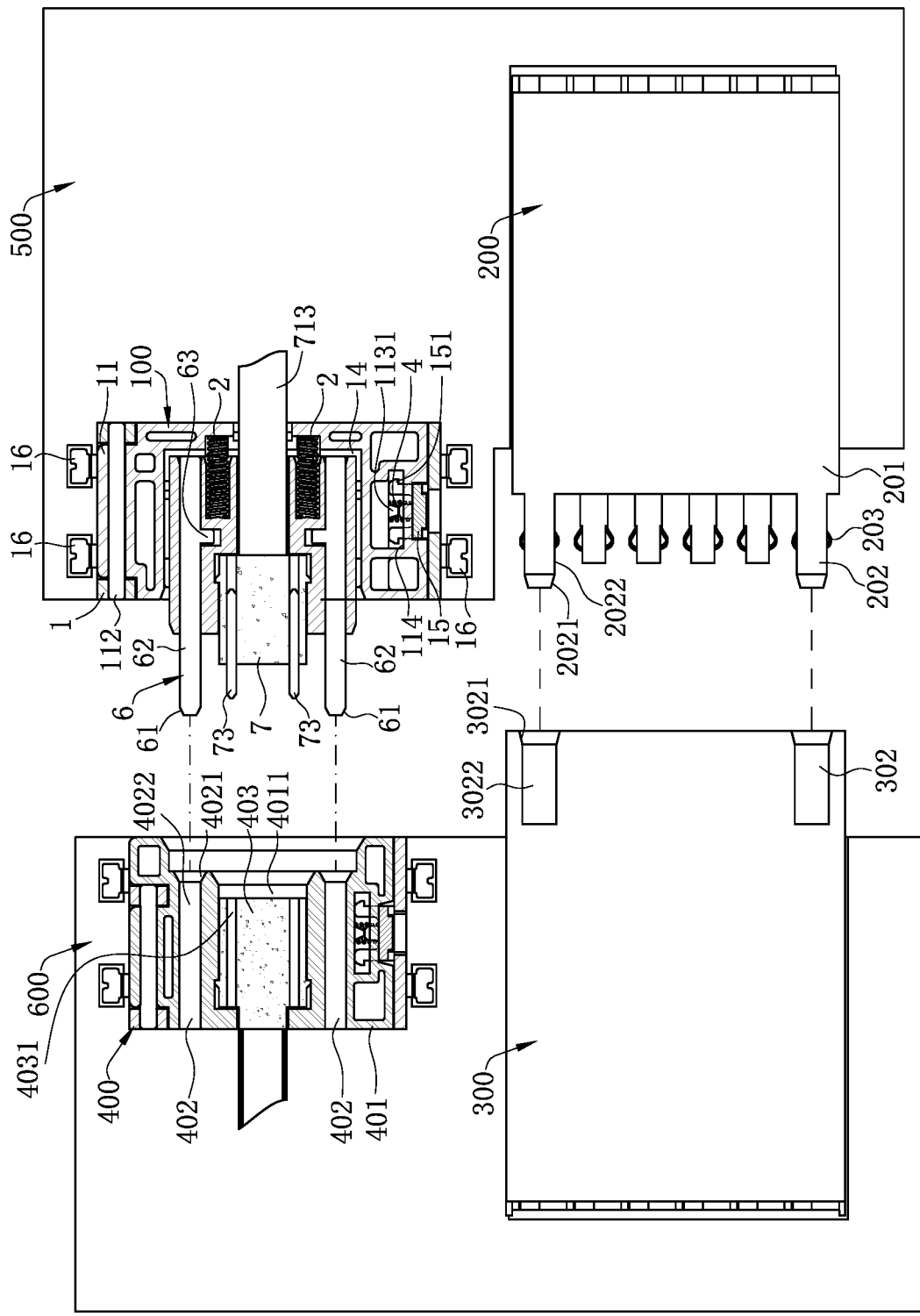
FIG. 9 is a sectional view of the assembly according to the first embodiment of the present invention, where the electrical connector assembly is not mated with a mating electrical connector assembly, and the optical fiber connector assembly is not mated with a mating optical fiber connector assembly.
Figure 12:
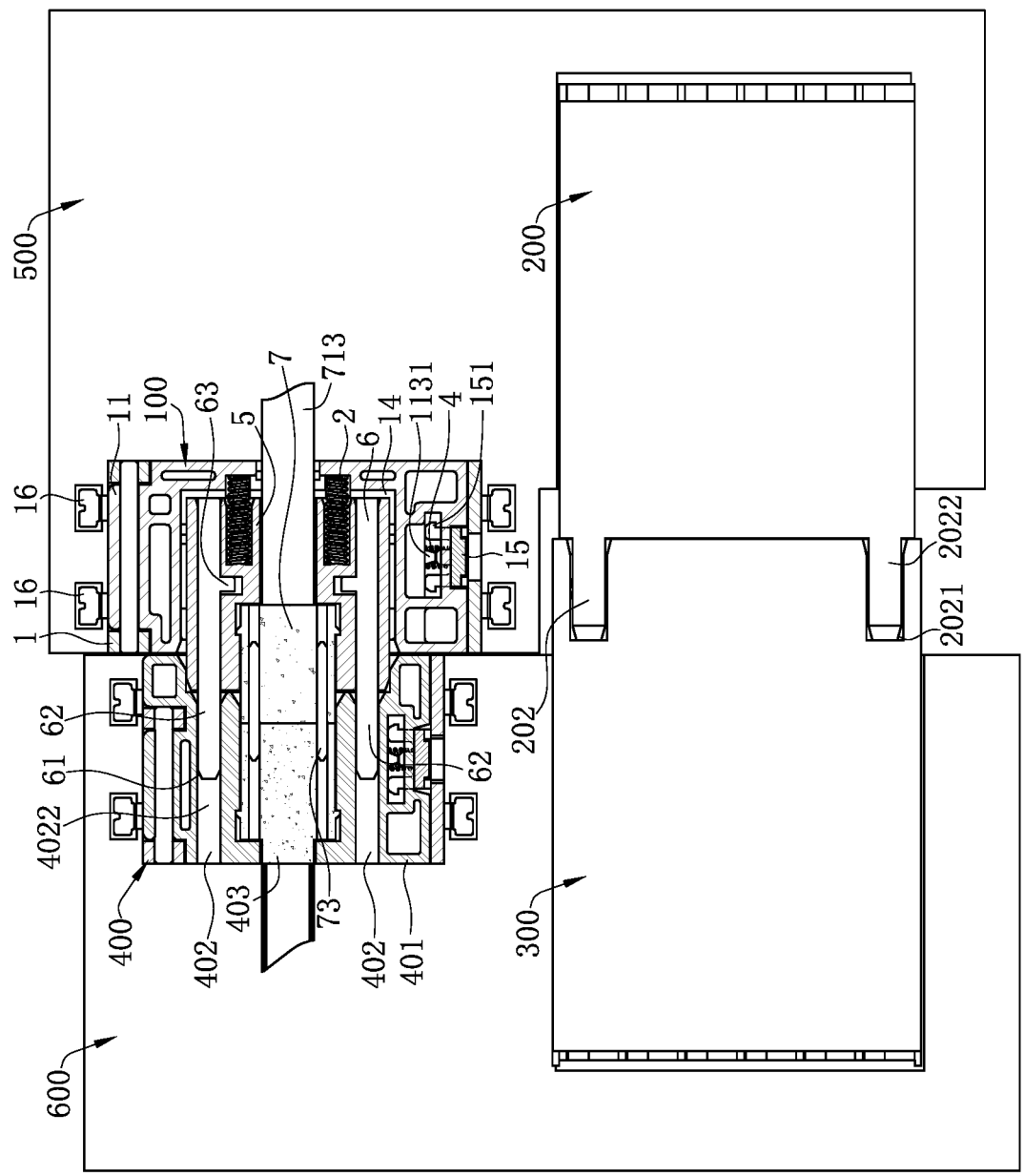
FIG. 12 is a schematic view of the assembly in FIG. 9, where the electrical connector assembly and the optical fiber connector assembly has been mated with the mating electrical connector assembly and the mating optical fiber connector assembly respectively.

As shown in FIG. 1, FIG. 9 and FIG. 12, an assembly of an electrical connector combination and an optical fiber connector combination according to one embodiment of the present invention includes a first circuit board 500. The first circuit board 500 is provided with an electrical connector assembly 200 and an optical fiber connector assembly 100 side by side. The electrical connector assembly 200 is protrudingly provided with a first guiding mechanism 202 in a front-rear direction. The first guiding mechanism 202 includes a first guiding section 2021 positioned at a front end thereof, and a second guiding section 2022 extending backward from the first guiding section 2021. The optical fiber connector assembly 100 is provided with an aligning portion 73 in the front-rear direction. A second circuit board 600 is disposed opposite to the first circuit board 500. The second circuit board 600 is provided with a mating electrical connector assembly 300 and a mating optical fiber connector assembly 400 side by side. The mating electrical connector assembly 300 is provided with a first matching region 302 corresponding to the first guiding mechanism 202. The first matching region 302 includes a first matching section 3021 and a second matching section 3022 extending backward from the first matching section 3021. The mating optical fiber connector assembly 400 is provided with an adaptation portion 4031. When the first guiding section 2021 penetrates through the first matching section 3021 and enters the second guiding section 2022, the aligning portion 73 starts entering the adaptation portion 4031. When the first guiding mechanism 202 completely enters the first matching region 302, the electrical connector assembly 200 mates with the mating electrical connector assembly 300 to form the electrical connector combination; and when the aligning portion 73 completely enters the adaptation portion 4031, the optical fiber connector assembly 100 mates with the mating optical fiber connector assembly 400 to form the optical fiber connector combination.

Figure 10:
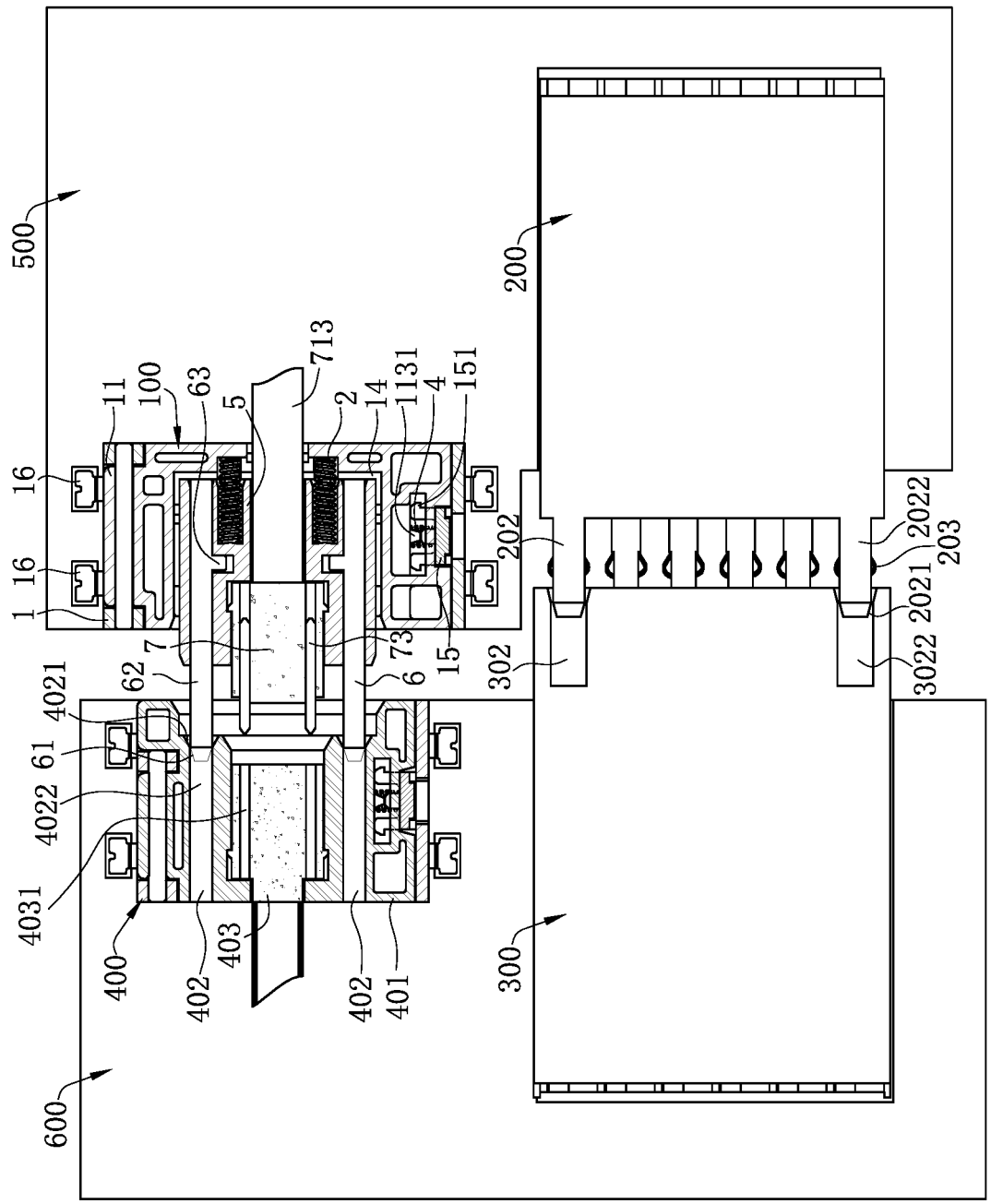
FIG. 10 is a schematic view of the assembly in FIG. 9, where the electrical connector assembly and the optical fiber connector assembly are simultaneously mated with the mating electrical connector assembly and the mating optical fiber connector assembly respectively.

As shown in FIG. 1, FIG. 10 and FIG. 12, the electrical connector assembly 200 is fixedly mounted on the first circuit board 500. The electrical connector assembly 200 includes a plastic body 201 and multiple conductive terminals 203 which are accommodated in the plastic body 201, and the multiple conductive terminals 203 are all soldered to the first circuit board 500 to be electrically conductive to the first circuit board 500. The first guiding mechanism 202 is formed by integrally protruding forward from a front end surface of the plastic body 201. The first guiding mechanism 202 is a square column. In the present embodiment, the first guiding mechanism 202 and the plastic body 201 are integrally formed, and in other embodiments, the first guiding mechanism 202 can be provided independently, and then assembled to the plastic body 201. The first guiding mechanism 202 has the first guiding section 2021 and the second guiding section 2022 which are connected with each other in the front-rear direction. The first guiding section 2021 is provided with two chamfers at two sides thereof in a left-right direction respectively, so that a width of the first guiding section 2021 is gradually increased backward from the front. A width of the second guiding section 2022 at various locations thereof may be the same.

Figure 2:
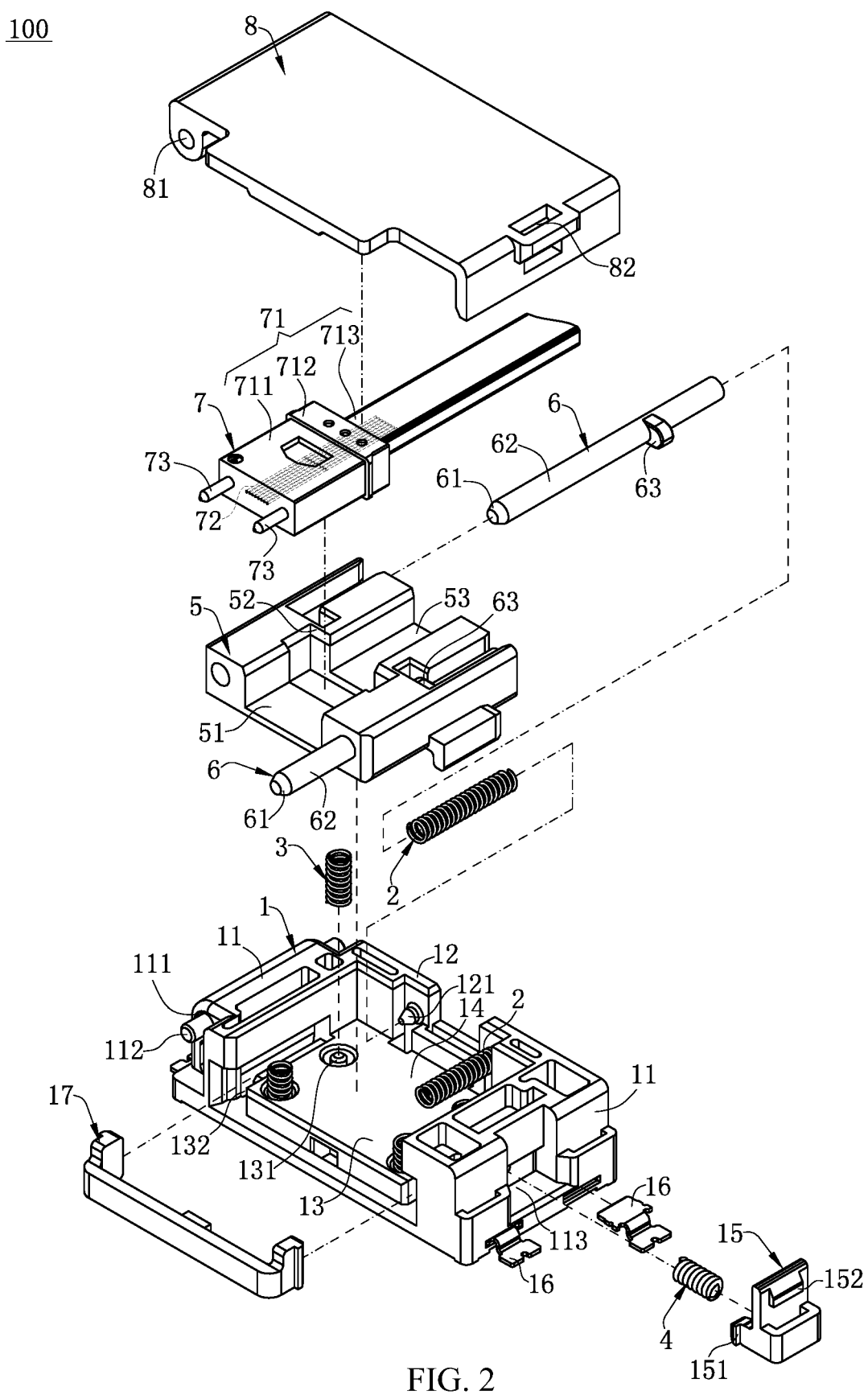
FIG. 2 is a perspective exploded view of an optical fiber connector assembly according to the first embodiment of the present invention.
Figure 3:
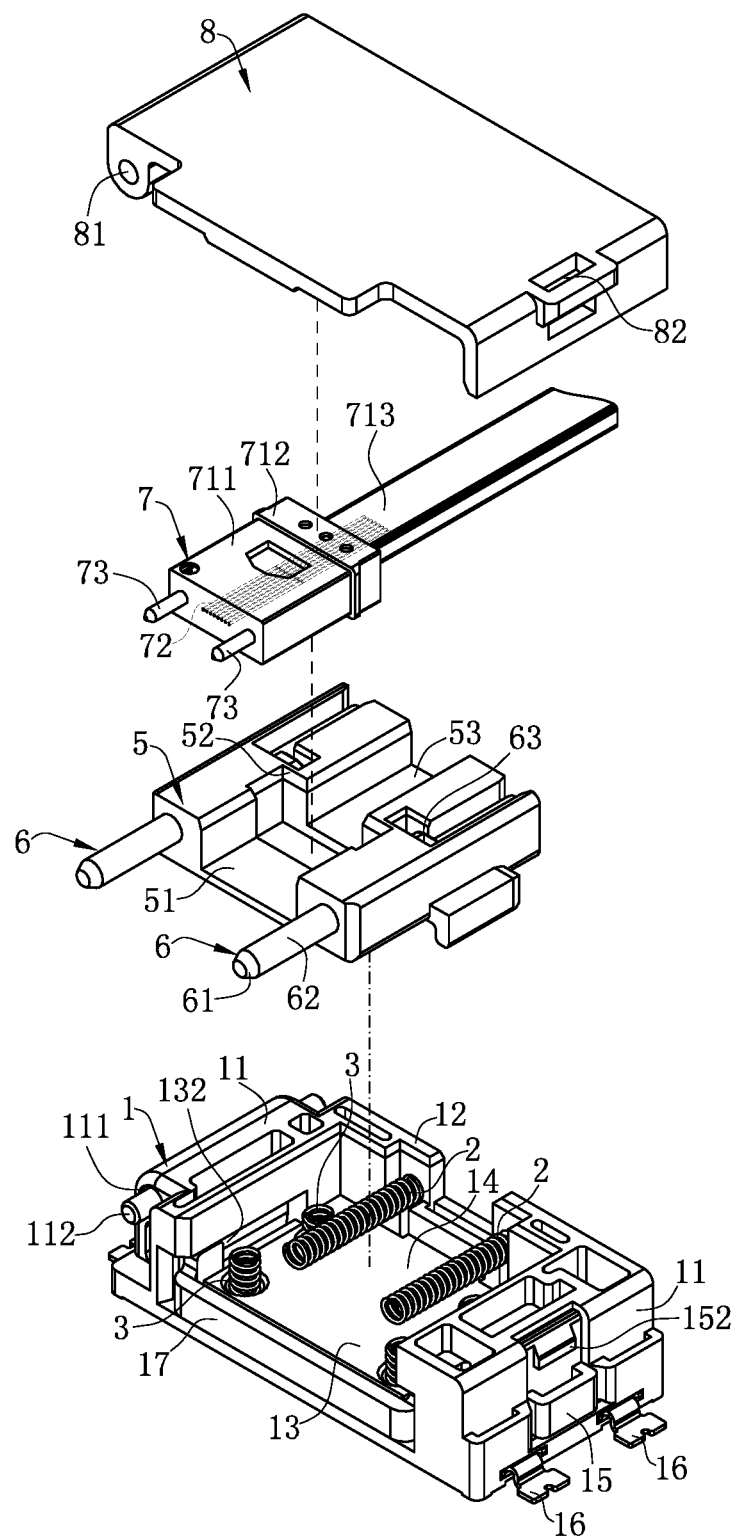
FIG. 3 is a partially assembled view of the optical fiber connector assembly according to the first embodiment of the present invention.
Figure 4:
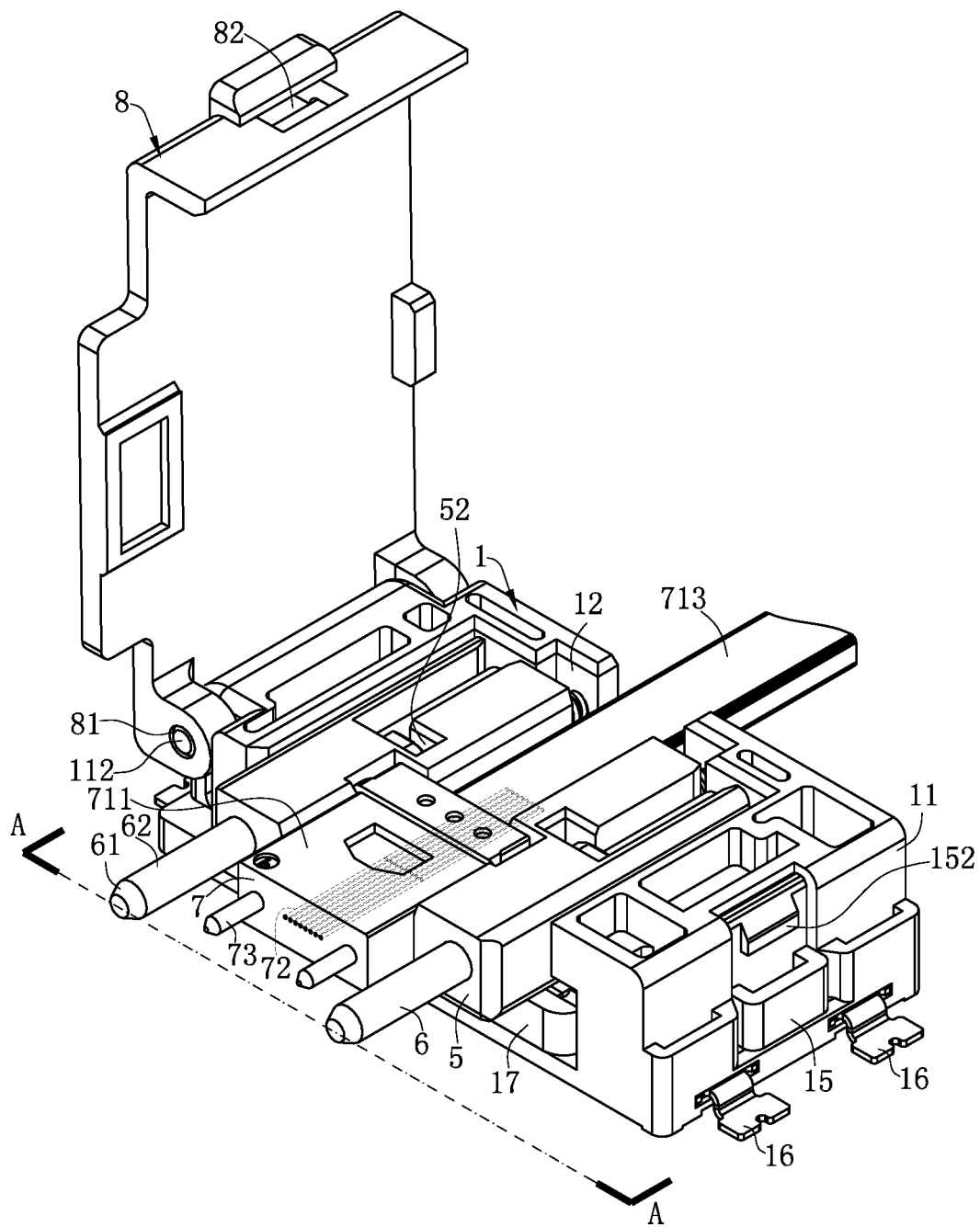
FIG. 4 is an assembled view of the optical fiber connector assembly according to the first embodiment of the present invention.

As shown in FIG. 2, FIG. 3 and FIG. 4, the optical fiber connector assembly 100 includes a fixing seat 1 which is mounted on the first circuit board 500, a sliding seat 5 which is movably mounted on the fixing seat 1, and an optical fiber connector 7 which is mounted on the sliding seat 5. The optical fiber connector 7 is floatable with respect to the fixing seat 1 in the front-rear direction, the left-right direction and a vertical direction. Specifically, by means of the optical fiber connector 7 being "floatable", the optical fiber connector 7 can move for a small distance with respect to the fixing seat 1 in the front-rear direction, the left-right direction and the vertical direction. In the present embodiment, the optical fiber connector 7 is fixedly mounted on the sliding seat 5, and gaps are formed between the sliding seat 5 and the fixing seat 1 in the front-rear direction, the left-right direction and the vertical direction respectively, so that the sliding seat 5 is floatable with respect to the fixing seat 1, thus the optical fiber connector 7 can float along with the sliding seat 5 to adjust the position of the optical fiber connector assembly 100 conveniently, thereby allowing the optical fiber connector assembly 100 to be accurately inserted in the mating optical fiber connector assembly 400. In other embodiments, the optical fiber connector 7 can also be movably provided on the sliding seat 5. The fixing seat 1 is provided with at least one first elastic member 2 and at least one second elastic member 3. In the present embodiment, the fixing seat 1 is provided with two first elastic members 2 and four second elastic members 3. The first elastic members 2 elastically abut the sliding seat 5 in the front-rear direction, and the second elastic members 3 elastically abut the sliding seat 5 in the vertical direction. The fixing seat 1 has two side walls 11 respectively provided at a left side and a right side thereof, a rear stopping wall 12 connecting the two side walls 11, and a bottom plate 13. The two side walls 11, the rear stopping wall 12 and the bottom plate 13 jointly define an accommodating space 14 for accommodating the sliding seat 5. The rear stopping wall 12 is protrudingly provided with at least one first post 121 forward. The sliding seat 5 is protrudingly provided with a second post 54 backward and opposite to the first post 121. One end of each of the first elastic members 2 is fixed on the first post 121, and the other end of each of the first elastic members 2 is fixed on the second post 54 to limit the first elastic members 2. The front end of the bottom plate 13 of the fixing seat 1 is further recessed downward to form a U-shaped groove 132. A supporting member 17 is fixedly mounted in the U-shaped groove 132, and the supporting member 17 is also U-shaped. The front end of the sliding seat 5 is positioned above the supporting member 17. The supporting member 17 supports the sliding seat 5 upward, thus preventing the front end of the sliding seat 5 from sinking and affecting the flatness of the sliding seat 5, which may further affect the mating effect of the optical fiber connector 7.

Figure 5:
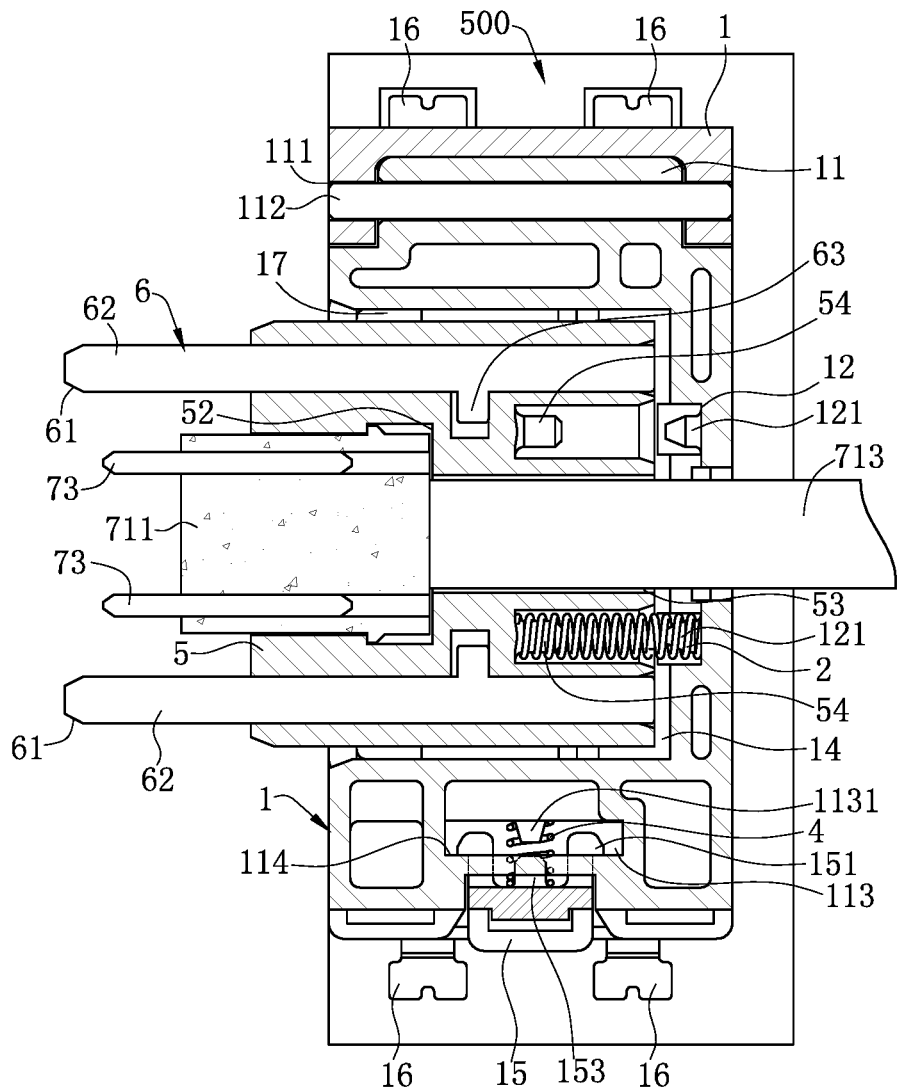
FIG. 5 is a sectional view along a line A-A in FIG. 4.

As shown in FIG. 2, FIG. 3 and FIG. 5, the fixing seat 1 is provided with a through hole 111 penetrating one side of the fixing seat 1 in the front-rear direction, and a latch member 15 provided at the other side of the fixing seat 1. A pivot 112 is inserted and fixed in the through hole 111, and two ends of the pivot 112 are projected out of the through hole 111. One side of a cover 8 has two pivoting holes 81 which are respectively pivoted with the two ends of the pivot 112, and a buckle portion 82 is provided at the other side of the cover 8 to latch with the latch member 15. The cover 8 is pivoted to the fixing seat 1, and can be closed to cover the base 401 or unscrewed to open the base 401. When the buckle portion 82 is latched with the latch member 15, the cover 8 covers the optical fiber connector 7, so that the optical fiber connector 7 can be fixed, and can be further prevented from being damaged. When the optical fiber connector 7 needs to be changed, only the cover 8 needs to be unscrewed to open, then the optical fiber connector 7 can be taken out. Thus, it is convenient to change the optical fiber connector 7, and the operation is simple. The fixing seat 1 is protrudingly provided with at least one third post 131 in the accommodating space 14 in the vertical direction. One end of the second elastic member 3 is sleeved on the third post 131, and the other end of the second elastic member 3 abuts the bottom surface of the sliding seat 5. The other side of the fixing seat 1 is concavely provided with an accommodating groove 113, and two stopping portions 114 are protrudingly provided in the accommodating groove 113 opposite to each other. The two stopping portions 114 are positioned on the same plane in the front-rear direction. The latch member 15 is movably mounted in the accommodating groove 113, and can float in the left-right direction. Two hook portions 151 are provided at one side of the latch member 15 at intervals and enter the accommodating groove 113. The two hook portions 151 are both positioned between the inner wall surface of the accommodating groove 113 and the two stopping portions 114. Each stopping portion 114 is used for stopping a corresponding hook portion 151, thus ensuring that the hook portions 151 have moving gaps in the accommodating groove 113 and preventing the hook portions 151 from being separated from the accommodating groove 113. A latch block 152 is protrudingly provided at the other side of the latch member 15 towards a direction away from the hook portions 151 to latch with the buckle portion 82. The latch member 15 is protrudingly provided with a fourth post 153 which is positioned between the two hook portions 151, and the inner wall surface of the accommodating groove 113 is protrudingly provided with a fifth post 1131 integrally and opposite to the fourth post 153. One end of a third elastic member 4 is sleeved on the fourth post 153, and the other end of the third elastic member 4 is sleeved on the fifth post 1131. When the cover 8 covers the fixing seat 1, the latch member 15 compresses the third elastic member 4 and moves towards the inside of the accommodating groove 113, so that the latch block 152 is buckled on the buckle portion 82. In the present embodiment, the buckle portion 82 is a penetrating groove. By the arrangement of the third elastic member 4, the cover 8 is elastically fastened on the fixing seat 1, thus preventing the buckle portion 82 from breaking. The fixing seat 1 is mounted on the first circuit board 500, and multiple retaining slots 115 are concavely formed in the fixing seat 1. One end of each of multiple metal members 16 is retained in one of the retaining slots 115, and the other end of each of the metal members 16 is soldered to the first circuit board 500. In the present embodiment, the first elastic members 2, the second elastic members 3 and the third elastic member 3 are all linear springs, but are not limited thereto.

As shown in FIG. 2, FIG. 3 and FIG. 5, the front end surface of the sliding seat 5 is backward sequentially and concavely provided with a first accommodating groove 51 and a second accommodating groove 53 communicating with each other, and a width of the second accommodating groove 53 is smaller than a width of the first accommodating groove 51. A step surface 52 is provided between the first accommodating groove 51 and the second accommodating groove 53. The optical fiber connector 7 includes an insulating seat 71. The insulating seat 71 includes a mating section 711 and a connecting section 713 extending backwards from the mating section 711, and a width of the connecting section 713 is smaller than a width of the mating section 711. Multiple optical fibers 72 are exposed at a front end of the mating section 711 and extend to the connecting section 713. The mating section 711 is fixed in the first accommodating groove 51, and the connecting section 713 is partially accommodated in the second accommodating groove 53. The step surface 52 is positioned at the rear end of the mating section 711, and is used for stopping the mating section 711 from moving backward. Two stopping blocks 712 are protrudingly provided at two sides of the insulating seat 71 in the left-right direction respectively, and two stopping portions 114 are protrudingly provided at the left side and the right side of the first accommodating groove 51 respectively and oppositely. The two stopping portions 114 are positioned in front of the stopping blocks 712, and are used for stopping the stopping blocks 712 from moving forward, thereby ensuring that the optical fiber connector 7 has an appropriate floating gap in the front-rear direction, and further preventing the optical fiber connector 7 from being separated from the sliding seat 5.

As shown in FIG. 2, FIG. 3 and FIG. 5, the sliding seat 5 is protrudingly provided with a second guiding mechanism 6 in the front-rear direction. The second guiding mechanism 6 includes a third guiding section 61 positioned at a front end thereof and a fourth guiding section 62 extending backward from the third guiding section 61. In the present embodiment, the second guiding mechanism 6 is a cylinder. The second guiding mechanism 6 is assembled to the sliding seat 5, and the outer surface of the second guiding mechanism 6 is protrudingly provided with a fixing block 63 which is fastened in a groove of the sliding seat 5. Because the sliding seat 5 is floatable with respect to the fixing seat 1, the second guiding mechanism 6 can float along with the sliding seat 5. Because the optical fiber connector 7 is fixedly mounted on the sliding seat 5, the optical fiber connector 7 can float along with the sliding seat 5 to adjust the position of the second guiding mechanism 6 conveniently, so that the second guiding mechanisms 6 can be accurately inserted in the mating optical fiber connector assembly 400, thus facilitating alignment and positioning are facilitated, and the guiding effect is better. The third guiding section 61 is provided with two chamfers at two sides thereof in the left-right direction respectively, so that a width of the third guiding section 61 is gradually increased backward from the front. A width of the fourth guiding section 62 at various locations thereof may be the same. In the present embodiment, second guiding mechanisms 6 are respectively provided at the left side and the right side of the sliding seat 5, and aligning portions 73 are respectively provided at the left side and the right side of the insulating seat 71. In the present embodiment, the aligning portions 73 are cylinders. The aligning portions 73 are assembled to the insulating seat 71, and the front ends of the aligning portions 73 is positioned behind the third guiding sections 61.

As shown in FIG. 1, FIG. 9 and FIG. 12, the second circuit board 600 is provided opposite to the first circuit board 500, and is parallel to the first circuit board 500. In the present embodiment, the second circuit board 600 and the first circuit board 500 are positioned on the same horizontal plan. The mating electrical connector assembly 300 is fixedly mounted on the second circuit board 600. The mating electrical connector assembly 300 includes an insulating body 301 and multiple mating terminals 303 which are accommodated in the insulating body 301. One end of each of the mating terminals 303 correspondingly mates with one of the conductive terminal 203 electrically, and the other end of each of the mating terminals 303 is soldered to the second circuit board 600, so as to be electrically conductive to the second circuit board 600. The first matching region 302 is formed by recessing backward from the front end surface of the insulating body 301 to match with the first guiding mechanism 202. The first matching region 302 has the first matching section 3021 and the second matching section 3022 which communicates with the first matching section 3021. A width of the first matching section 3021 is gradually reduced backward from the front, namely, the first matching section 3021 is also provided with chamfers. A width of the second matching section 3022 is smaller than or equal to a minimum width of the first matching section 3021, so that the first guiding section 2021 can be inserted conveniently. In the present embodiment, the width of the second matching section 3022 is equal to the minimum width of the first matching section 3021. In other embodiments, the width of the first matching section 3021 at various locations thereof may be the same, namely, the first matching section 3021 does not have chamfers, as long as it is ensured that the first guiding section 2021 and the second guiding section 2022 can be inserted in the first matching section 3021.

Figure 6:
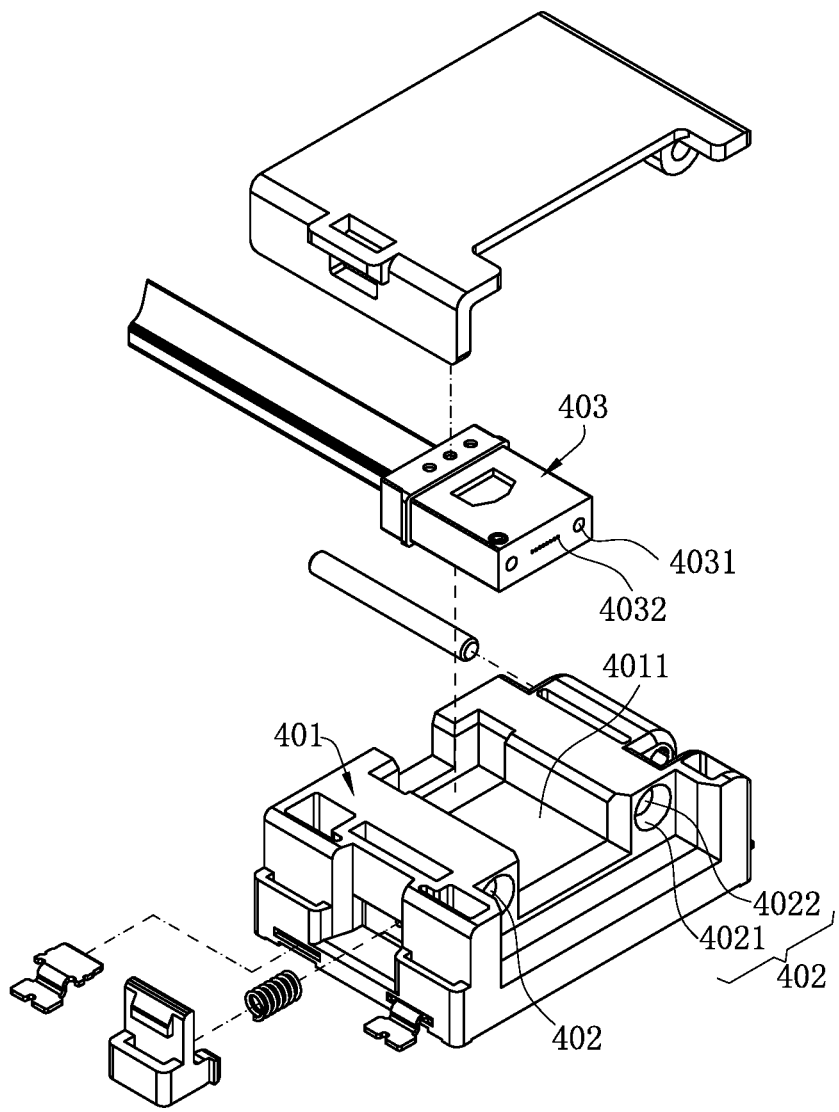
FIG. 6 is a perspective exploded view of a mating optical fiber connector assembly according to the first embodiment of the present invention.
Figure 7:
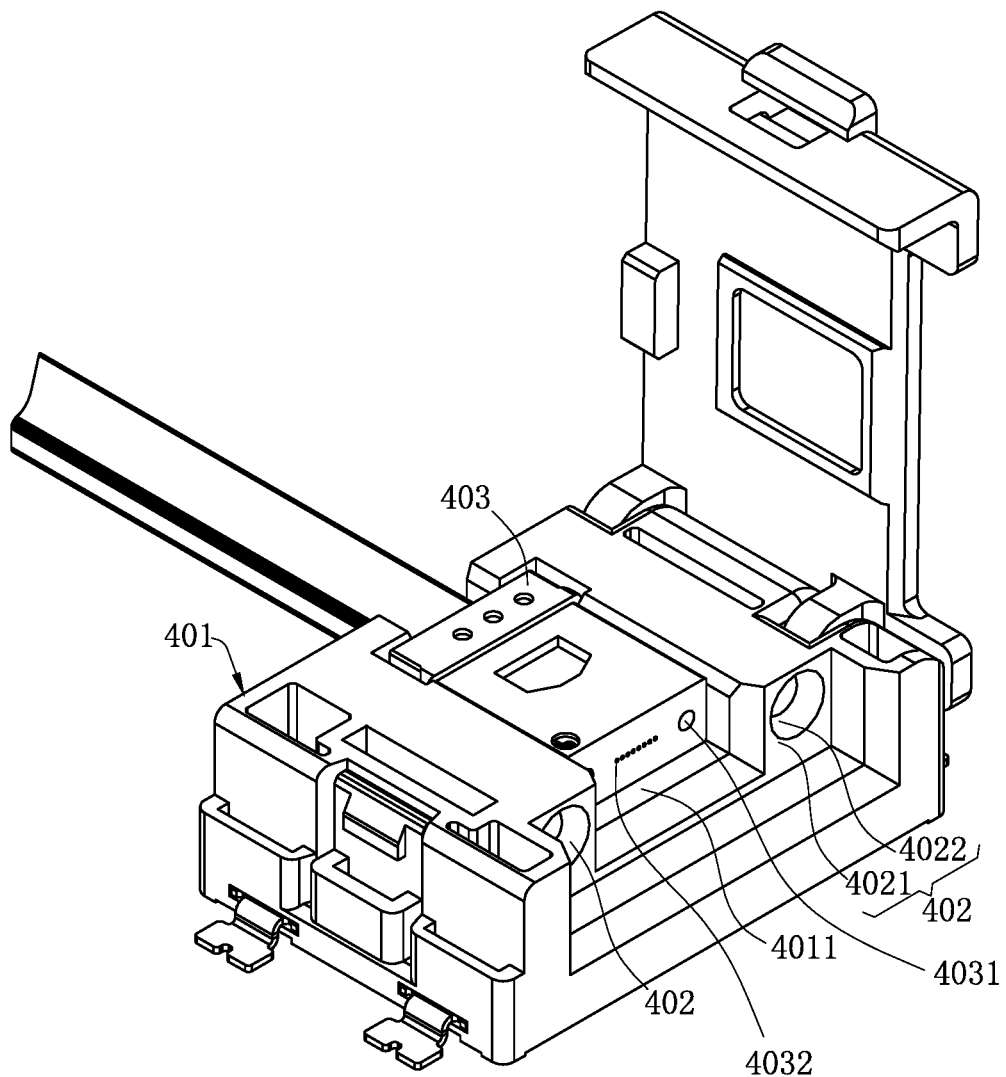
FIG. 7 is an assembled view of the mating optical fiber connector assembly according to the first embodiment of the present invention.
Figure 8:
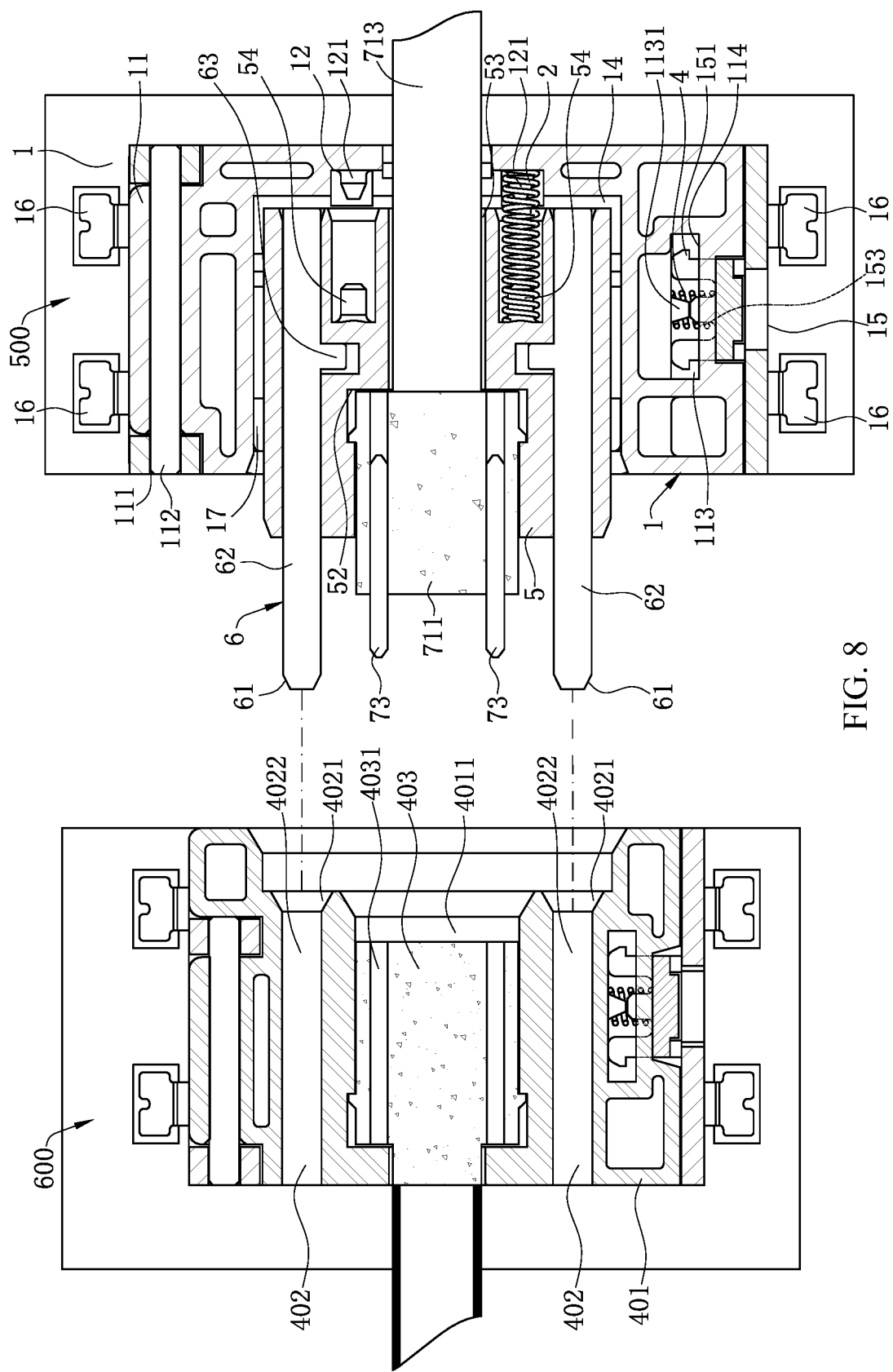
FIG. 8 is a sectional view of the optical fiber connector assembly and the mating optical fiber connector assembly before mating according to the first embodiment of the present invention.

As shown in FIG. 6, FIG. 7 and FIG. 8, the mating optical fiber connector assembly 400 includes a base 401 which is fixedly mounted on the second circuit board 600, and a mating optical fiber connector 403 fixedly mounted on the base 401. The top surface of the base 401 is concavely provided with form an accommodating space 4011 downward for accommodating the mating optical fiber connector 403. The structure of the base 401 is substantially identical to that of the fixing seat 1. The base 401 is also provided with multiple metal members 16 for soldering the base 401 to the second circuit board 600, and the cover 8 is pivoted on one side of the base 401 for covering the mating optical fiber connector 403. The structure of the mating optical fiber connector 403 is identical to that of the optical fiber connector 7, and thus description is not elaborated herein. The left side and the right side of the mating optical fiber connector 403 are respectively concavely provided with two adaptation portions 4031 to correspondingly match with the two aligning portions 73. The mating optical fiber connector 403 has multiple mating optical fibers 4032 for mating with the optical fibers 72. The base 401 is provided with a second matching region 402. The second matching region 402 includes a third matching section 4021 and a fourth matching section 4022 extending backward from the third matching section 4021. A width of the third matching section 4021 is gradually reduced backward from the front. A width of the fourth matching section 4022 is smaller than or equal to a minimum width of the first matching section 3021. In the present embodiment, the width of the fourth matching section 4022 is equal to the minimum width of the third matching section 4021. In other embodiments, a width of the third matching section 4021 at various locations thereof may be the same, namely, the third matching section 4021 does not have chamfers, as long as it is ensured that the third guiding section 61 and the fourth guiding section 62 can be inserted in the third matching section 4021.

Figure 11:
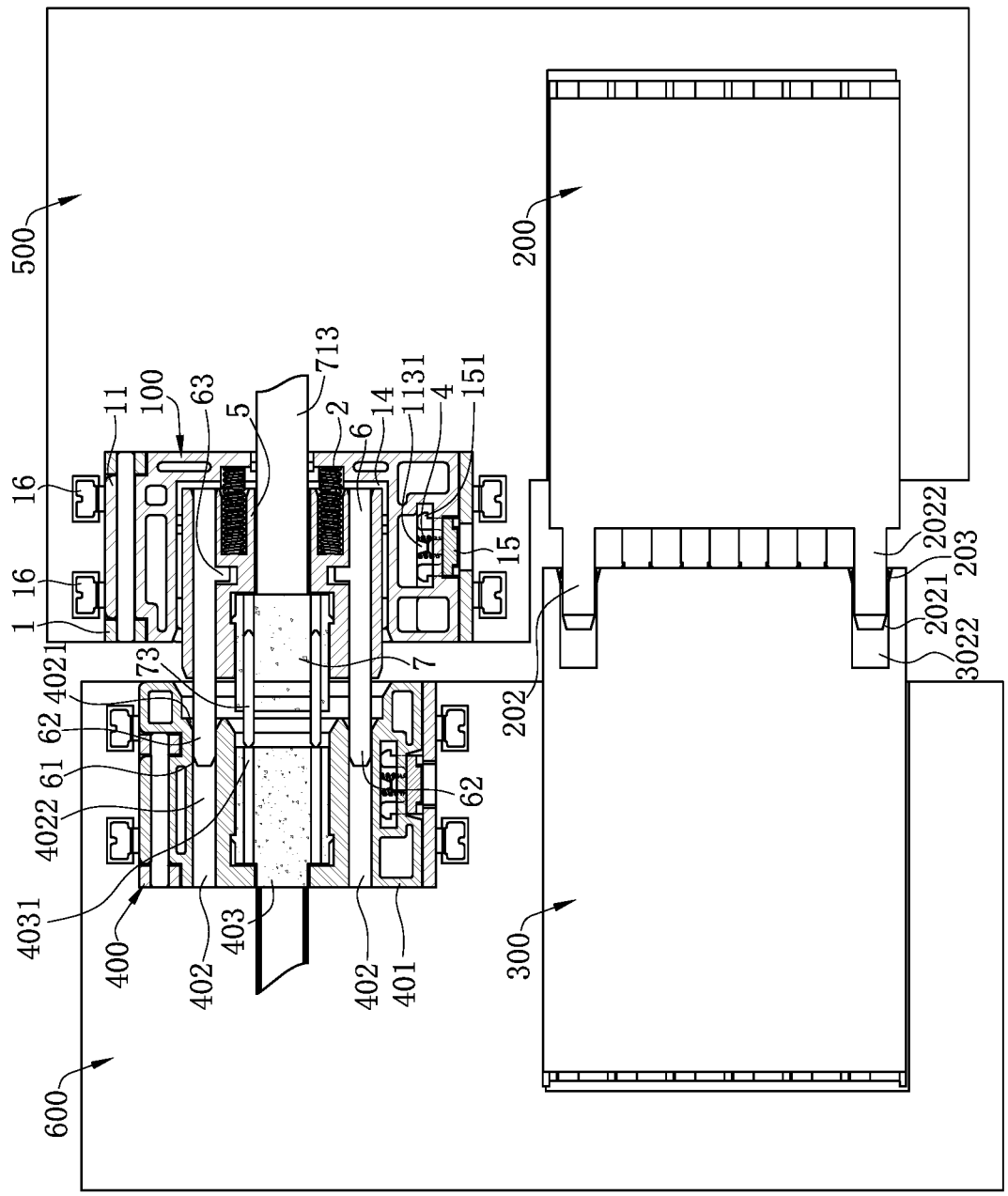
FIG. 11 is a schematic view of the assembly in FIG. 9, where the optical fiber connector and the mating optical fiber connector are in a state of mating.

As shown in FIG. 9, FIG. 10 and FIG. 11, when the electrical connector assembly 200 starts mating with the mating electrical connector assembly 300, the optical fiber connector assembly 100 also starts mating with the mating optical fiber connector assembly 400. That is, the electrical connector assembly 200 and the optical fiber connector assembly 100 respectively mate with the mating electrical connector assembly 300 and the mating optical fiber connector assembly 400 correspondingly and simultaneously. When mating begins, the first guiding mechanism 202 is aligned to the first matching region 302, and the second guiding mechanism 6 is aligned to the second matching region 402. The size of the first guiding mechanism 202 and the size of the second guiding mechanism 6 are large, and therefore alignment is facilitated. Then, the first guiding section 2021 of the first guiding mechanism 202 enters the first matching section 3021. Meanwhile, the third guiding section 61 of the second guiding mechanism 6 enters the third matching section 4021. As shown in FIG. 10, the first guiding section 2021 penetrates through the first matching section 3021 and enters the second matching section 3022. Meanwhile, the third guiding section 61 penetrates through the third matching section 4021 and enters the fourth matching section 4022. As shown in FIG. 11, the aligning portion 73 starts entering the adaptation portion 4031. As shown in FIG. 12, when the aligning portion 73 completely enters the adaptation portion 4031, the optical fiber 72 mates with the mating optical fibers 4032, and mating between the optical fiber connector 7 and the mating optical fiber connector 403 is complete. Meanwhile, the conductive terminals 203 mate with the mating terminals 303, and mating between the electrical connector assembly 200 and the mating electrical connector assembly 300 is also complete. The first guiding mechanism 202 matches with the first matching region 302. Meanwhile, the optical fiber connector assembly 100 is additionally provided with the second guiding mechanism 6, and the mating optical fiber connector assembly 400 is correspondingly additionally provided with the second matching region 402. The second guiding mechanism 6 matches with the second matching region 402, thus increasing a force for guiding the aligning portion 73 of the optical fiber connector assembly 100 to be aligned to the adaptation portion 4031 of the mating optical fiber connector assembly 400, so that the aligning portion 73 can be accurately inserted therein. Further, the three times guiding enables the optical fiber connector 7 and the mating optical fiber connector 403 to be aligned accurately, and the signal transmission rate is high, thus preventing the aligning portion 73 from being inserted askew, crashed and even broken, preventing the optical fiber connector assembly 100 from being damaged, and thereby ensuring the optical fiber 72 to mate with the mating optical fiber 4032 well, and the signal transmission effect is good. In the present embodiment, the optical fiber connector assembly 100 is provided with the second guiding mechanism 6, and the mating optical fiber connector assembly 400 is provided with the second matching region 402. In other embodiments, the optical fiber connector assembly 100 may not be provided with the second guiding mechanism 6, and the mating optical fiber connector assembly 400 may not be provided with the second matching region 402. In this case, the effects of preventing the optical fiber connector assembly 100 from being damaged and ensuring the optical fibers 72 to butt the mating optical fibers 4032 well can be achieved by guiding through the first guiding mechanism 202 arranged on the electrical connector assembly 200.

Figure 13:
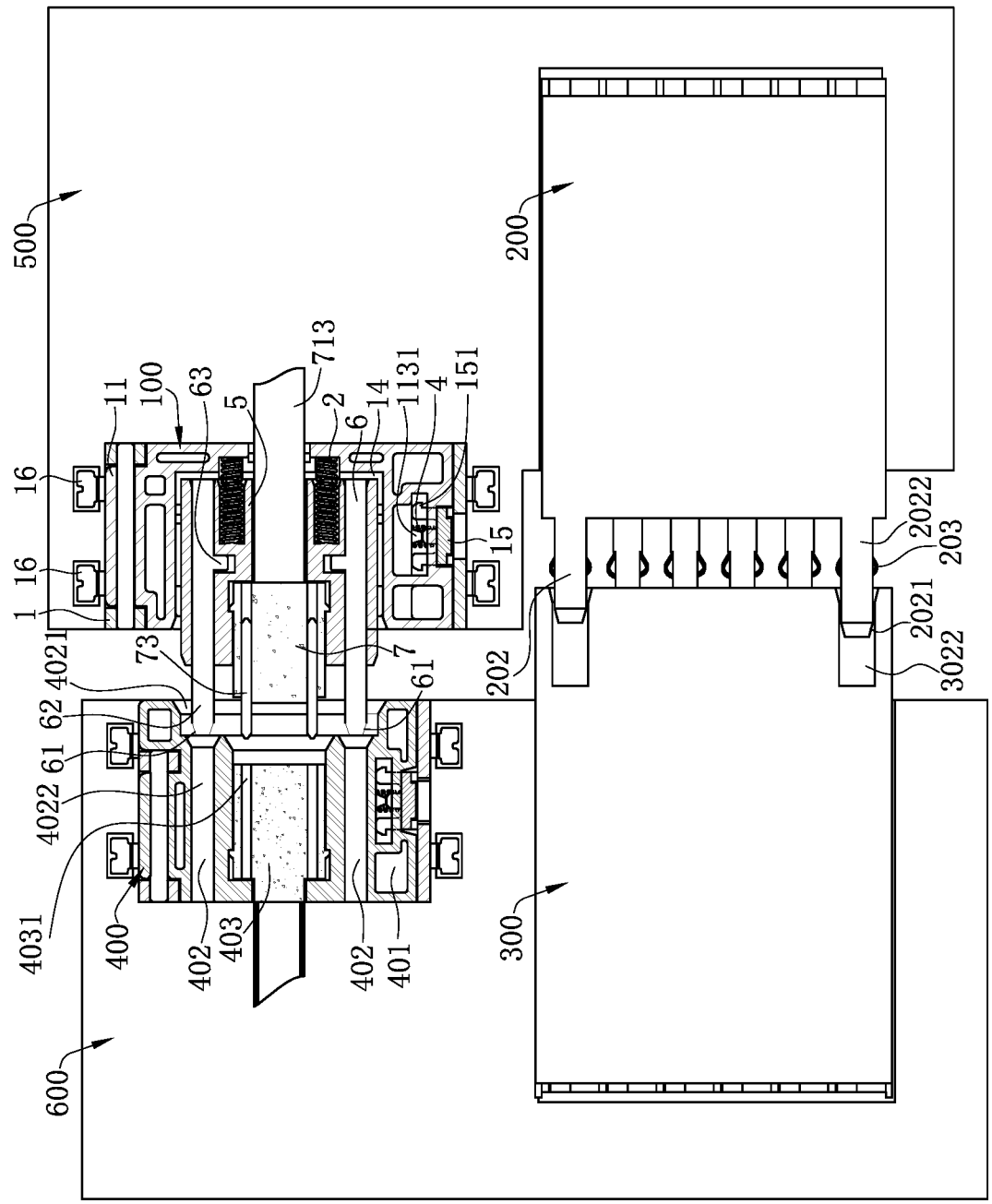
FIG. 13 is a schematic view of the assembly according to a second embodiment of the present invention, where an electrical connector assembly is mated with a mating connector assembly at first, and then an optical fiber connector assembly is mated with a mating optical fiber connector assembly.

FIG. 13 shows a second embodiment of the present invention. Compared with the first embodiment, the second embodiment has the following differences. When the electrical connector assembly 200 starts mating with the mating electrical connector assembly 300, the optical fiber connector assembly 100 does not start mating with the mating optical fiber connector assembly 400. That is, the electrical connector assembly 200 mates with the mating electrical connector assembly 300 at first, and then the optical fiber connector assembly 100 mates with the mating optical fiber connector assembly 400. After the first guiding section 2021 penetrates through the first matching section 3021 and enters the second matching section 3022, the third guiding sections 61 starts entering the third matching section 4021. Then, after the third guiding section 61 penetrates through the third matching section 4021 and enters the fourth matching section 4022, the aligning portion 73 starts entering the adaptation portion 4031. Thus, the optical fiber connector 7 and the mating optical fiber connector 403 are aligned to each other by three-time guiding, so that the optical fiber connector 7 mates with the mating optical fiber connector 403 accurately, thus preventing the optical fiber connector assembly 100 from being damaged and ensuring the optical fibers 72 to butt the mating optical fibers 4032 well.

Figure 14:
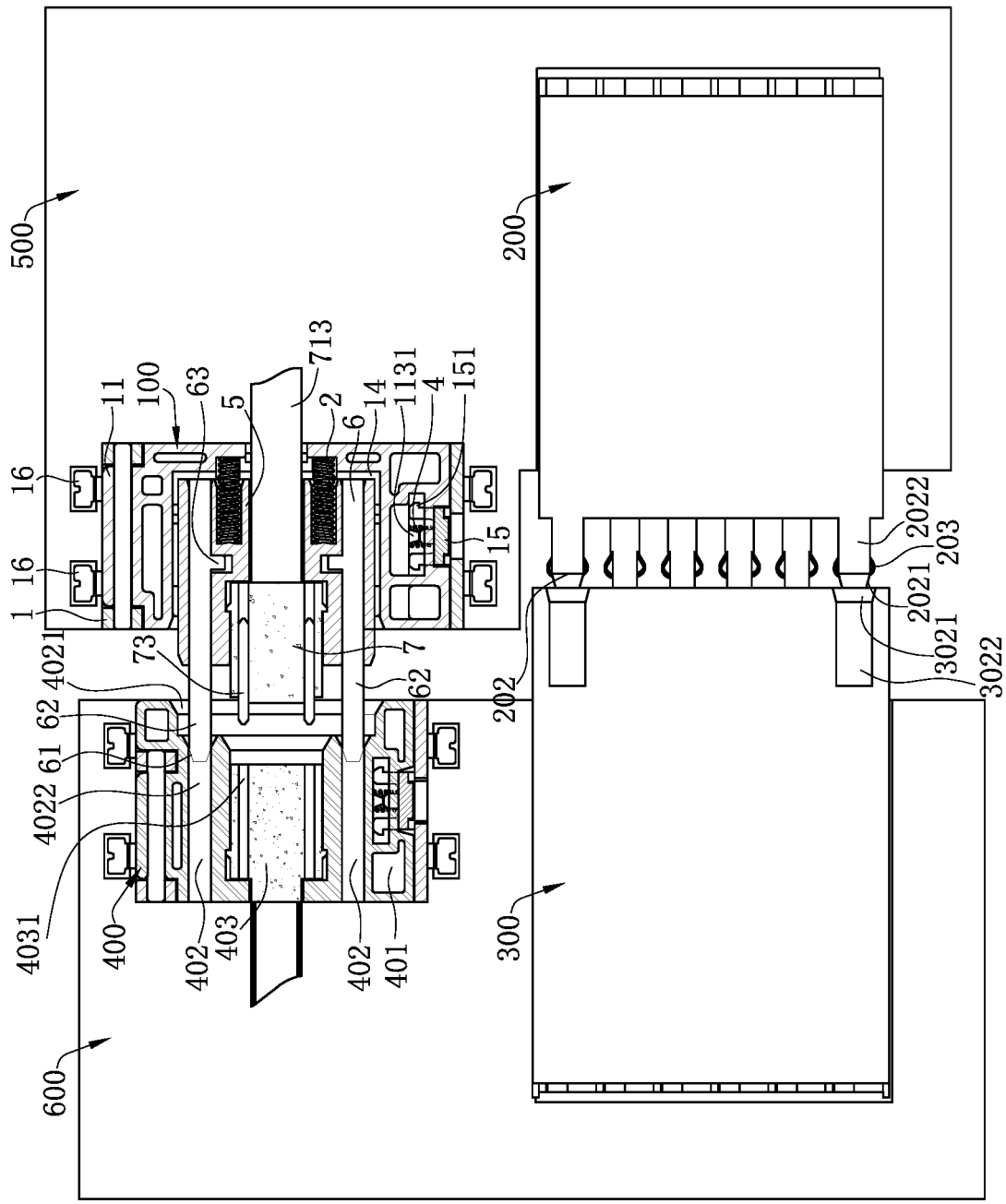
FIG. 14 is a schematic view of the assembly according to a third embodiment of the present invention, where an optical fiber connector assembly is mated with a mating optical fiber connector assembly at first, and then an electrical connector assembly is mated with a mating electrical connector assembly.

FIG. 14 shows a third embodiment of the present invention. Compared with the first embodiment, the third embodiment has the following differences. When the optical fiber connector assembly 100 starts mating with the mating optical fiber connector assembly 400, the electrical connector assembly 200 does not start mating with the mating electrical connector assembly 300. That is, the optical fiber connector assembly 100 mates with the mating optical fiber connector assembly 400 at first, and then the electrical connector assembly 200 mates with the mating electrical connector assembly 300. After the third guiding section 61 penetrates through the third matching section 4021 and enters the fourth matching section 4022, the first guiding section 2021 penetrates through the first matching section 3021 and enters the second matching section 3022. Then, after the first guiding section 2021 penetrates through the first matching section 3021 and enters the second matching section 3022, the aligning portion 73 starts entering the adaptation portion 4031. Thus, the optical fiber connector 7 is aligned to the mating optical fiber connector 403 by three-time guiding, so that the optical fiber connector 7 mates with the mating optical fiber connector 403 accurately, thus preventing the optical fiber connector assembly 10 from being damaged and ensuring the optical fibers 72 to butt the mating optical fibers 4032 well.

The assembly of the electrical connector combination and the optical fiber connector combination according to certain embodiments of the present invention has the following beneficial effects:

(1) The first guiding mechanism 202 matches with the first matching region 302, so as to guide the aligning portion 73 of the optical fiber connector assembly 100 to be aligned to the adaptation portion 4031 of the mating optical fiber connector assembly 400, so that the aligning portion 73 can be accurately inserted therein, thus preventing the aligning portion 73 from being inserted askew, crashed and even broken, preventing the optical fiber connector assembly 100 from being damaged, and thereby ensuring the optical fiber 72 to mate with the mating optical fiber 4032 well, and the signal transmission effect is good.

(2) The optical fiber connector assembly 100 is additionally provided with the second guiding mechanism 6, and the mating optical fiber connector assembly 400 is correspondingly additionally provided with the second matching region 402, thus increasing a force for guiding the aligning portion 73 of the optical fiber connector assembly 100 to be aligned to the adaptation portion 4031 of the mating optical fiber connector assembly 400, so that the aligning portion 73 can be accurately inserted therein. Further, the three times guiding enables the optical fiber connector 7 and the mating optical fiber connector 403 to be aligned accurately, and the signal transmission rate is high.

(3) The sliding seat 5 is floatable with respect to the fixing seat 1, and the optical fiber connector 7 is fixedly mounted on the sliding seat 5, so that the optical fiber connector 7 can float along with the sliding seat 5 to adjust the position of the second guiding mechanism 6 conveniently, so that the second guiding mechanisms 6 can be accurately inserted in the mating optical fiber connector assembly 400, thus facilitating alignment and positioning are facilitated, and the guiding effect is better.

(4) The front end of the sliding seat 5 is positioned above the supporting member 17, and the supporting member 17 supports the sliding seat 5 upward, thus preventing the front end of the sliding seat 5 from sinking and affecting the flatness of the sliding seat 5, which may further affect the mating effect of the optical fiber connector 7.

(5) When the buckle portion 82 is latched with the latch member 15, the cover 8 covers the optical fiber connector 7, so that the optical fiber connector 7 can be fixed, and can be further prevented from being damaged. When the optical fiber connector 7 needs to be changed, only the cover 8 needs to be unscrewed to open, then the optical fiber connector 7 can be taken out. Thus, it is convenient to change the optical fiber connector 7, and the operation is simple.

(6) By the arrangement of the third elastic member 4, the cover 8 is elastically fastened on the fixing seat 1, thus preventing the buckle portion 82 from breaking.

(7) The step surface 52 is positioned at the rear end of the mating section 711, and is used for stopping the mating section 711 from moving backward. The two stopping portions 114 are protrudingly provided at the left side and the right side of the first accommodating groove 51 respectively and oppositely. The two stopping portions 114 are positioned in front of the stopping blocks 712, and are used for stopping the stopping blocks 712 from moving forward, thereby ensuring that the optical fiber connector 7 has an appropriate floating gap in the front-rear direction, and further preventing the optical fiber connector 7 from being separated from the sliding seat 5.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An assembly, comprising:
a first circuit board, provided with an electrical connector assembly and an optical fiber connector assembly side by side, wherein the electrical connector assembly is protrudingly provided with a first guiding mechanism in a front-rear direction, the first guiding mechanism comprises a first guiding section positioned at a front end thereof and a second guiding section extending backward from the first guiding section, the optical fiber connector assembly comprises a fixing seat mounted on the first circuit board, a sliding seat movably mounted on the fixing seat, and an optical fiber connector mounted on the sliding seat, the optical fiber connector assembly is provided with two aligning portions in the front-rear direction, and the two aligning portions are respectively provided at a left side and a right side of the optical fiber connector; and
a second circuit board opposite to the first circuit board, wherein the second circuit board is provided with a mating electrical connector assembly and a mating optical fiber connector assembly side by side, the mating electrical connector assembly is provided with a first matching region corresponding to the first guiding mechanism, the first matching region comprises a first matching section and a second matching section extending backward from the first matching section, the mating optical fiber connector assembly comprises a base mounted on the second circuit board and a mating optical fiber connector mounted on the base, the mating optical fiber connector assembly is provided with two adaptation portions, and the two adaptation portions are respectively provided at a left side and a right side of the mating optical fiber connector to correspondingly match with the two aligning portions,
wherein when the first guiding section penetrates through the first matching section and enters the second matching section, each of the two aligning portions starts entering a corresponding one of the two adaptation portions.

2. The assembly according to claim 1, wherein the first guiding section is provided with two chamfers at two sides thereof in a left-right direction respectively, a width of the first matching section is gradually decreased backward from a front, and a width of the second matching section is smaller than or equal to a minimum width of the first matching section.

3. The assembly according to claim 1, wherein:
the electrical connector assembly comprises a plastic body and a plurality of conductive terminals accommodated in the plastic body, and the first guiding mechanism is formed by protruding forward from a front end surface of the plastic body; and
the mating electrical connector assembly comprises an insulating body and a plurality of mating terminals accommodated in the insulating body, the mating terminals electrically mate with the conductive terminals correspondingly, and the first matching region is formed by recessing backward from a front end surface of the insulating body to match with the first guiding mechanism.

4. The assembly according to claim 3, wherein the conductive terminals are soldered to the first circuit board, the mating terminals are soldered to the second circuit board, the electrical connector assembly is fixedly mounted on the first circuit board, and the mating electrical connector assembly is fixedly mounted on the second circuit board.

5. The assembly according to claim 1, wherein the optical fiber connector is floatable with respect to the fixing seat in the front-rear direction, a left-right direction and a vertical direction, and the mating optical fiber connector is fixedly mounted on the base.

6. The assembly according to claim 1, wherein gaps are formed between the sliding seat and the fixing seat in the front-rear direction, the left-right direction and the vertical direction respectively, and the optical fiber connector is fixedly mounted on the sliding seat, so that the sliding seat is floatable with respect to the fixing seat.

7. The assembly according to claim 6, wherein the fixing seat is provided with at least one first elastic member and at least one second elastic member, the at least one first elastic member elastically abuts the sliding seat in the front-rear direction, and the second elastic member elastically abuts the sliding seat in the vertical direction.

8. The assembly according to claim 7, wherein the fixing seat has two side walls respectively provided at a left side and a right side thereof, and a rear stopping wall connecting the two side walls, the two side walls and the rear stopping wall jointly define an accommodating space for accommodating the sliding seat, the rear stopping wall is protrudingly provided with at least one first post forward, the sliding seat is protrudingly provided with a second post backward and opposite to the first post, one end of the at least one first elastic member is fixed on the at least one first post, and the other end of the at least one first elastic member is fixed on the second post.

9. The assembly according to claim 1, wherein:
the fixing seat is provided with a through hole penetrating one side of the fixing seat in the front-rear direction, and a latch member provided at the other side of the fixing seat;
a pivot is inserted and fixed in the through hole, and two ends of the pivot are projected out of the through hole; and
one side of a cover has two pivoting holes respectively pivoted with the two ends of the pivot, and a buckle portion is provided at the other side of the cover to latch with the latch member.

10. The assembly according to claim 1, wherein:
the sliding seat is protrudingly provided with a second guiding mechanism in the front-rear direction, and the second guiding mechanism comprises a third guiding section positioned at a front end thereof and a fourth guiding section extending backward from the third guiding section;
the base is provided with a second matching region, the second matching region comprises a third matching section and a fourth matching section extending backward from the third matching section; and
after the first guiding section penetrates through the first matching section and enters the second matching section, the third guiding section starts entering the third matching section, and after the third guiding section penetrates through the third matching section and enters the fourth matching section, the aligning portion starts entering the adaptation portion.

11. The assembly according to claim 1, wherein:
a front end surface of the sliding seat is backward sequentially and concavely provided with a first accommodating groove and a second accommodating groove communicating with each other, and a width of the second accommodating groove is smaller than a width of the first accommodating groove;
the optical fiber connector comprises an insulating seat;
the insulating seat comprises a mating section and a connecting section connected with the rear end of the mating section;
multiple optical fibers are exposed at a front end of the mating section and extend to the connecting section; and
the mating section is fixed in the first accommodating groove, and the connecting section is partially accommodated in the second accommodating groove.

\* \* \* \* \*